Figure 1:
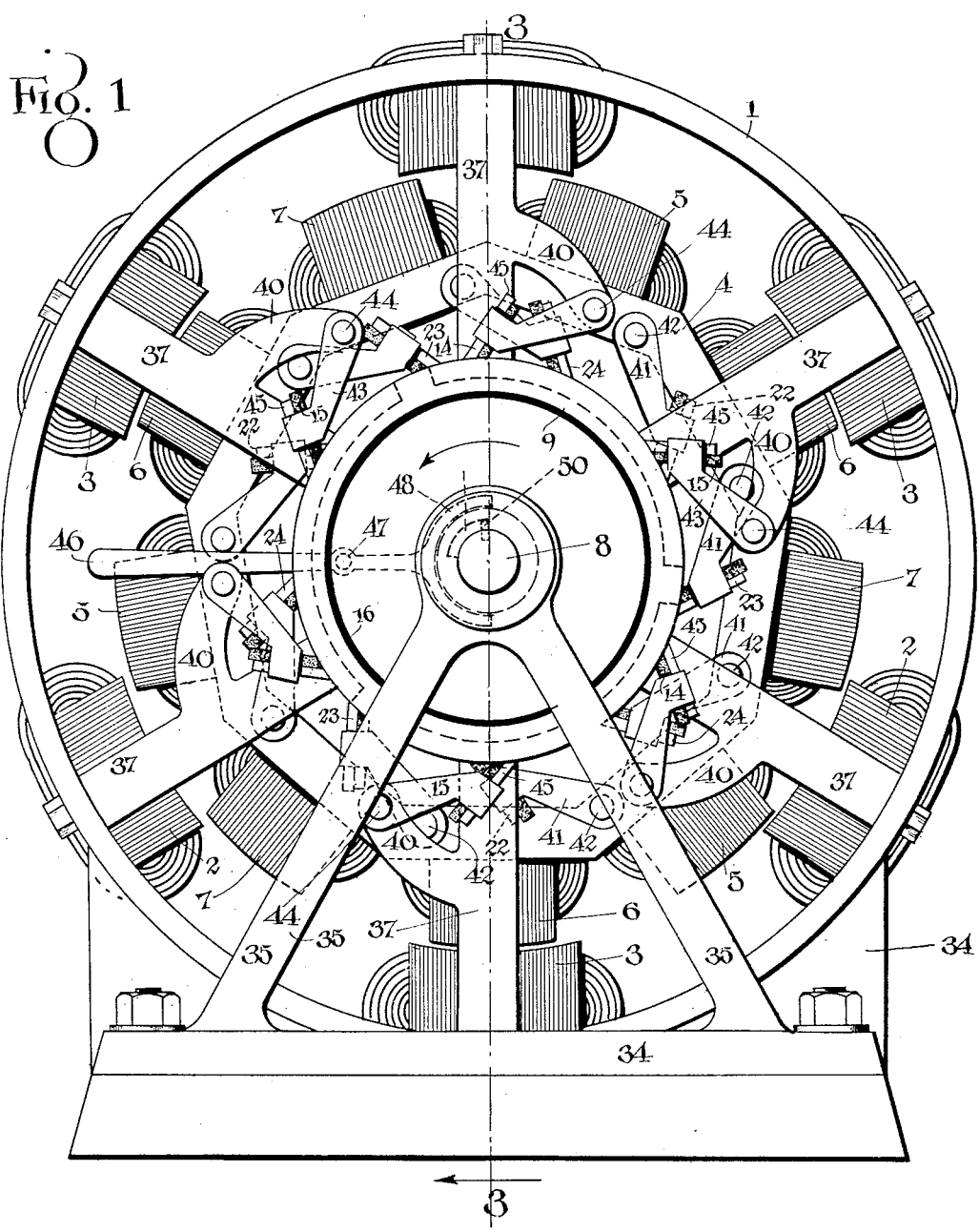

July 21, 1925.

R. H. DAVIS

MAGNETIC MOTOR

Original Filed July 7, 1920   4 Sheets-Sheet 1

1,546,720

WITNESSES

INVENTOR:
R. H. Davis.
BY
ATTORNEYS

July 21, 1925.  1,546,720
R. H. DAVIS
MAGNETIC MOTOR
Original Filed July 7, 1920    4 Sheets-Sheet 2
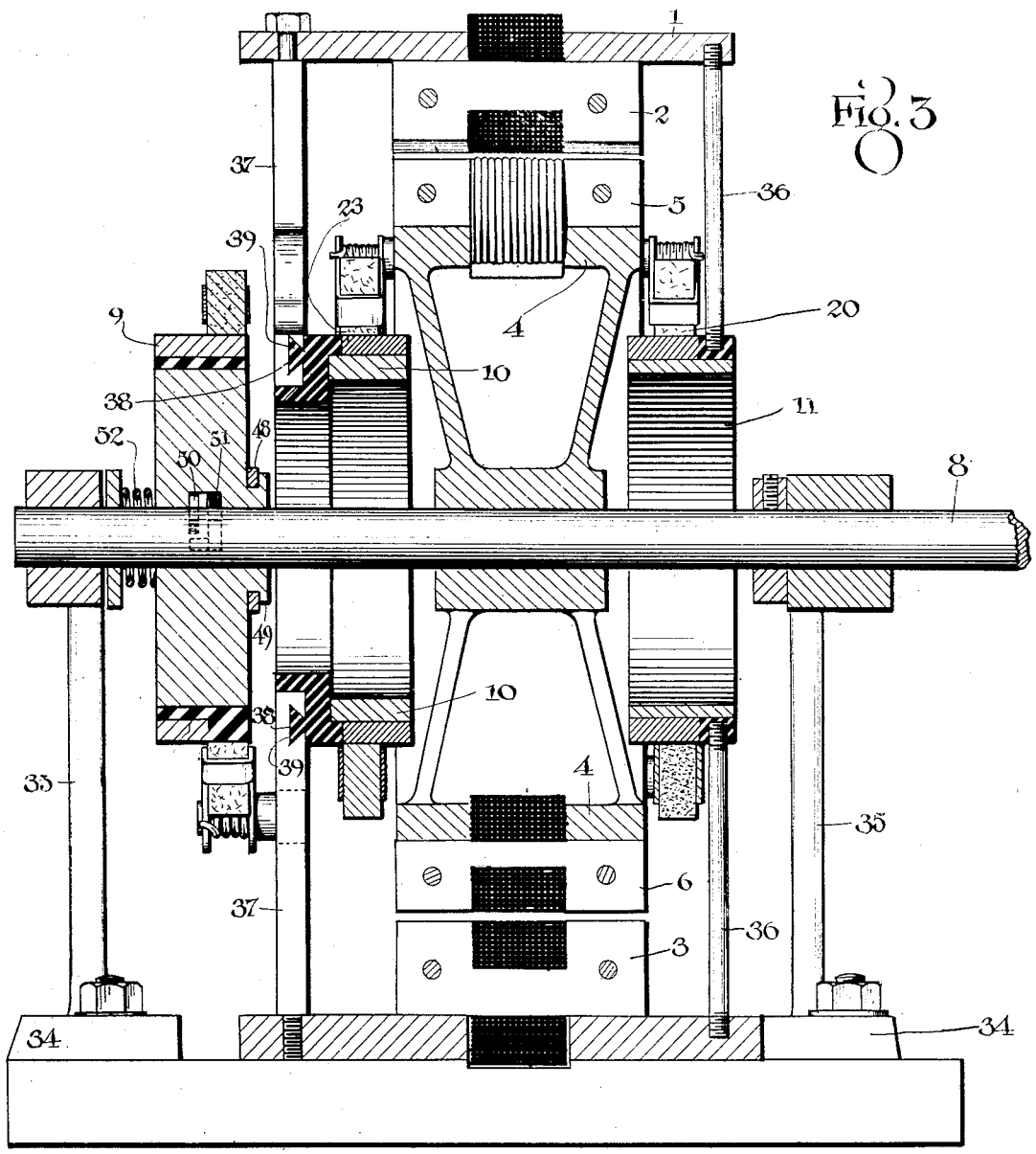
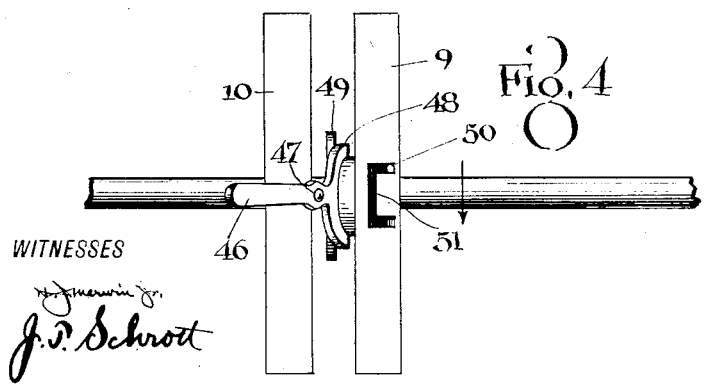
WITNESSES
INVENTOR
R.H.Davis.
BY
ATTORNEYS

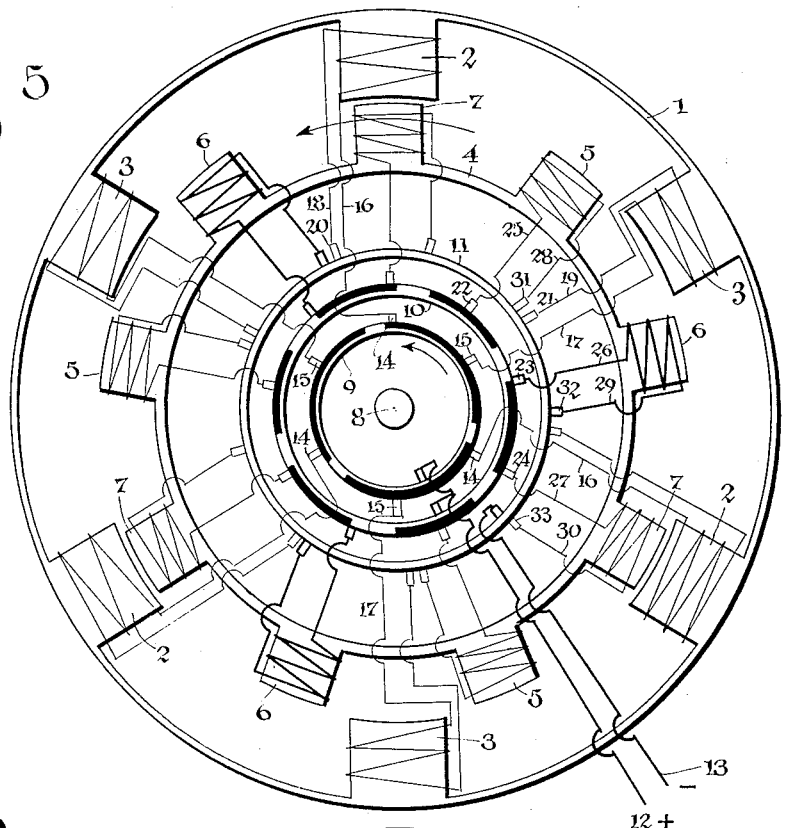
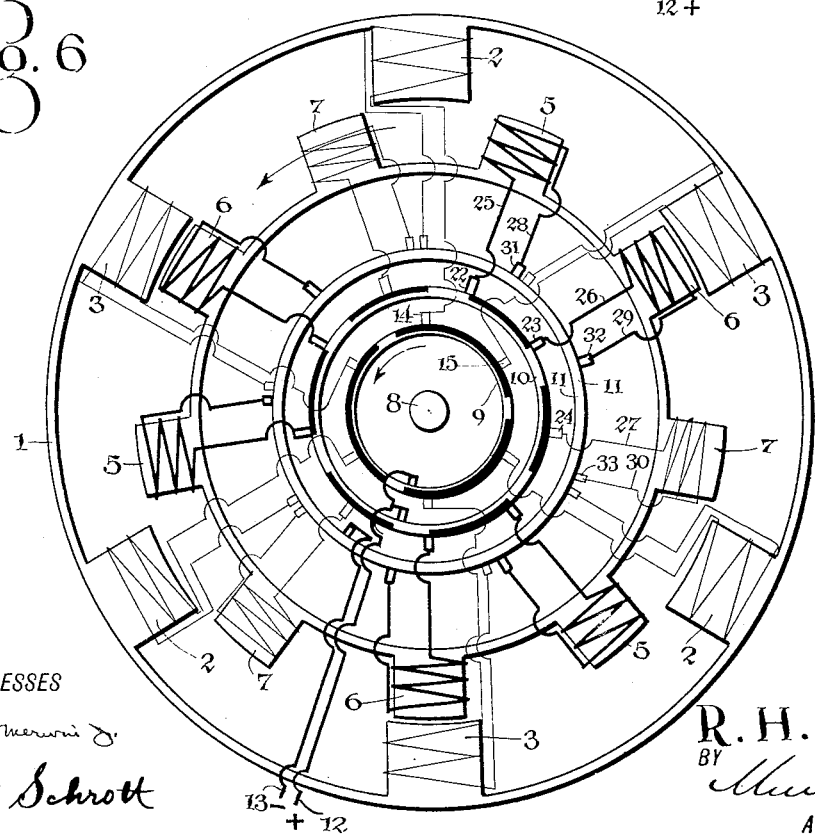

July 21, 1925.

R. H. DAVIS

MAGNETIC MOTOR

Original Filed July 7, 1920    4 Sheets-Sheet 4

1,546,720

WITNESSES

INVENTOR
R. H. Davis.
BY
ATTORNEYS

Patented July 21, 1925.

1,546,720

UNITED STATES PATENT OFFICE.

ROBERT H. DAVIS, OF DOW, OKLAHOMA, ASSIGNOR OF THREE-TENTHS TO JEWELL D. BROWDER, OF McALESTER, OKLAHOMA.

MAGNETIC MOTOR.

Application filed July 7, 1920, Serial No. 394,412. Renewed April 3, 1925.

*To all whom it may concern:*

Be it known that I, ROBERT H. DAVIS, a citizen of the United States, and a resident of Dow, in the county of Pittsburg and State of Oklahoma, have invented certain new and useful Improvements in Magnetic Motors, of which the following is a specification.

My invention relates to improvements in electric motors, it relating more particularly to that class known as magnetic motors, and it consists in the constructions, combinations and arrangements herein described and claimed.

One of the foremost objects of the invention is to provide a motor in which a uniform torque on the shaft is produced solely by magnets respectively on the stator or frame and rotor or armature, the energization of the various magnets occurring in symmetrical order so as to produce the uniform torque spoken of above.

Another object of the invention is to provide a motor wherein there is single energization of certain of the magnets of the armature at certain times, and a compound energization of certain armature magnets and field frame magnets at other times, the respective energizations occurring in a symmetrical order to produce a uniform torque on the shaft.

A further object of the invention is to provide a motor in which certain magnets of each of a plurality of series on the armature are energized singly and in succession to attract themselves to companion deenergized field frame magnets, the last magnet of each of said series and said companion field frame magnets being finally compoundly energized, the foregoing order of energization occurring symmetrically to produce a uniform torque on the shaft.

A further object of the invention is to provide a motor wherein the magnets of the field frame and armature are respectively in the ratio of 6 to 9 or its equivalent, for the purpose of carrying out the preceding order of energization.

A further object of the invention is to provide a motor, having no magnetic field which is commonly known as such, but which is made up of a field frame with a series of magnets producing consequent poles when energized, and an armature with a series of magnets producing opposite poles when energized, the energization of certain sets of field frame and armature magnets occurring in symmetrical order circumferentially of the shaft to produce a uniform driving torque.

A further object of the invention is to provide a simple mechanism by means of which the direction of rotation of the shaft may readily be reversed.

Figure 2:
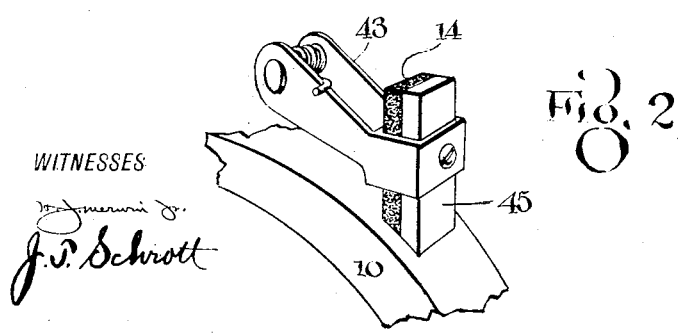
Figure 7:
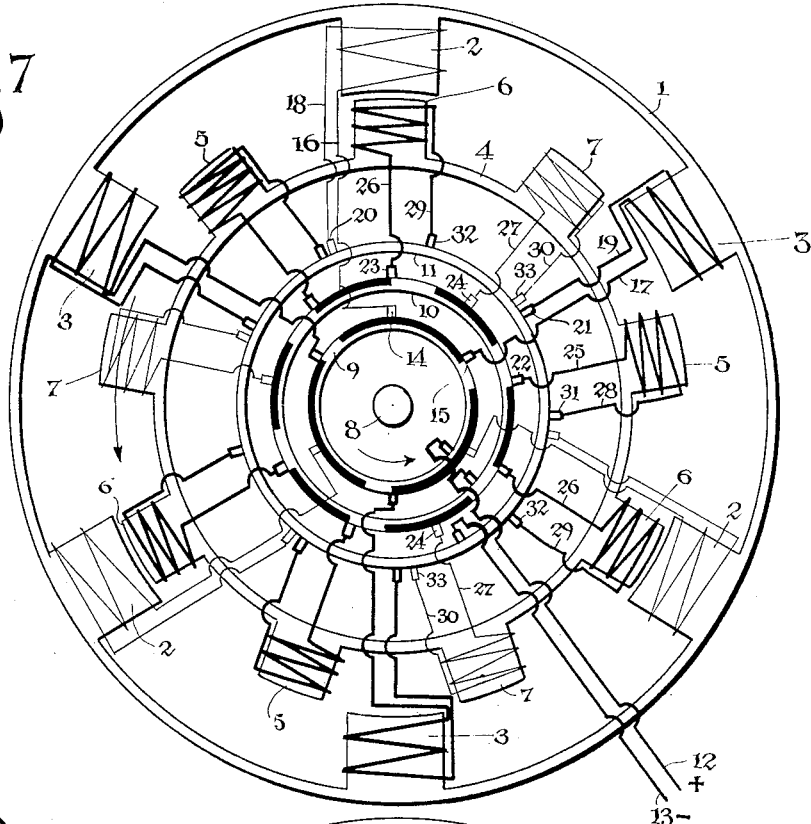
Figure 8:
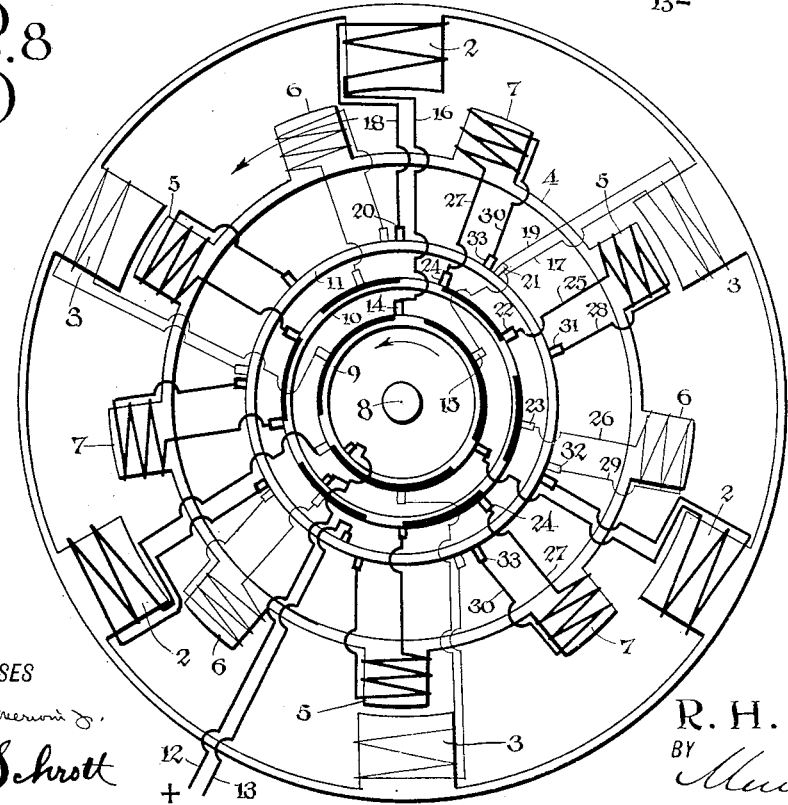

Other objects and advantages will appear in the following specification, reference being had to the accompanying drawings, in which:

Figure 1 is a front elevation of the improved magnetic motor,

Figure 2 is a detail perspective view of one of the brush holders, also illustrating the use of a lubricator for eliminating sparking on the distributor ring, Figure 3 is a vertical longitudinal section of the improved motor, taken substantially on the line 3—3 of Figure 1, Figure 4 is a diagrammatic side elevation of the frame and armature magnet current distributing rings, illustrating the single lever by means of which they are shifted to reverse the direction of rotation of the shaft, Figure 5 is a diagram illustrating the position of the armature magnet in respect to the field magnet, the instant after a tertiary set of field and armature magnets are compoundedly energized, Figure 6 is a diagram illustrating how the first armature magnets of the series of three magnets are energized following the above compound energization, Figure 7 is a diagram illustrating how the second magnets of the above series, are energized following said compound energization, and Figure 8 is a diagram illustrating how the third magnets of the aforesaid series on the armature, are energized together with the companion magnets on the frame, thus constituting the aforesaid compound energization.

It is of first importance that the reader should understand the mode of operation of the motor, and to that end, more particularly the peculiar manner in which certain sets of the field and armature magnets are energized in a symmetrical order in respect to the shaft, so as to produce the uniform driving torque which is one of the outstanding features of this motor.

The field frame 1 is stationary, and carries a series of six field magnets, which, for the purposes of the description below, are divided into a series of three pairs and individually designated 2 and 3.

The armature 4, which of course is the rotating element of the motor, carries a series of nine magnets, which, for the purposes of the description in connection with the above, are divided into three series of three magnets each, of which the individuals are designated 5, 6 and 7. In all cases the magnets are electro-magnets, all of the field frame magnets in the particular positions in Figures 5 and 6, being deenergized.

Although the field frame magnets 2 and 3 appear to be the counterparts of the usual pole pieces of motors as ordinarily known, they set up no permanent magnetic field within which the armature moves, according to well known practice, but on the contrary, are energized only at certain times to then assist in attracting the third magnets of the armature series, at such time producing an additional effort in turning the shaft 8, and in overcoming a possible retardation in the turning of the shaft by virtue of a counter-attraction occurring at that moment.

Three rings distribute the electric current to the magnets. And it must be understood in passing, that direct current is employed for the operation of this motor, because it is only direct current which will properly energize the electro-magnets; alternating current, as such, cannot be used. The three rings just spoken of, comprise the first ring 9, which rotates with the shaft 8 the second ring 10, which is stationary with the frame 1, and the third ring 11, which may either be made stationary or to rotate.

Current is conducted to the rings 9 and 10 by the lead 12, which has a common brush connection with both rings and a connection to the positive pole of any suitable source of energy, the return path for the current being provided by the lead 13, which has a brush connection with the last ring 11 and with the negative pole of the source of energy. For the purposes of regulating the speed of the motor, a suitable rheostat (not shown) may be connected in the positive lead 12.

Brushes 14 or 15 conduct positive current from the conducting segments of the ring 9 when they are reached, to the magnets 2 and 3 of the various series of the frame 1, wires 16 and 17 providing the connections. Similarly, wires 18 and 19 return the current to the brushes 20 and 21, bearing on the ring 11.

Brushes 22, 23 and 24 conduct positive current through wires 25, 26 and 27 through the respective magnets 5, 6 and 7 of the various armature series, when the conducting segments of the ring 10 engage. The current returns over wires 28, 29 and 30 to brushes 31, 32 and 33 bearing on the common return ring 11. This description is sufficient to enable the reader to easily follow the operation, in connection with the four wiring diagrams. The description of the operation is confined to the frame magnets 2 and 3 and the two series of armature magnets 5, 6 and 7 which operate in conjunction with these frame magnets. In considering this part of the operation, the reader must bear in mind that precisely the same things are occurring at two other regions, thus producing a tertiary operation at evenly distributed points, all of which makes for the application of a uniform driving torque to the shaft 8.

Assume first the position in Figure 5. All of the same magnets are de-energized, the positive brushes 14 having just been reached by an insulating strip on the ring 9, the other positive brushes 15 being well advanced along the same strips. Magnet 5, first of the armature magnet series 5, 6 and 7, is approaching the frame magnet 2, but is de-energized since its brush 22 is well advanced over an insulating strip of the ring 10.

Armature magnet 6, second of the series 5, 6 and 7, is just becoming energized since its brush 23 has received a conducting segment of the ring 10, and being in a correct relative position to the frame magnet 3, attracts itself to the magnet 3 and causes the movement of shaft 8. The armature magnet 7, last of the series of three, is deenergized, its brush 24 having just reached an insulating strip of the ring 10.

Assume now the position in Figure 6. The magnet 5, first of the armature series of three, has reached the position of proper influence in respect to the frame magnet 2, and having become energized by reason of its brush 22 having reached a conducting segment of the ring 10, attracts itself to the frame magnet 2 and thus causes the movement of shaft 8. The armature magnet 6, initially energized in Figure 5 to attract itself to the frame magnet 3, is about to become deenergized since it has reached the center of the frame magnet 3, and its brush 23 is about to move upon an insulating strip of the ring 10. Armature magnet 7, third of the series, still remains deenergized.

Assume now the position in Figure 7. The armature magnet 6, second of the series, is shown as having passed through its zone of attraction to the frame magnet 2, and about to be deenergized by the proximity of its brush 23 to an insulating strip of the ring 10. The armature magnet 7 had become energized to attract itself to the frame magnet 3, when it assumed the same position in respect to magnet 3, as is assumed by the magnet 5 in Figure 7.

It is important to observe the action which takes place between Figures 7 and 8. While the magnet 7, third of the armature series described above, is deenergized, the magnet 5, first of the second armature series, has reached the position of attraction to the frame magnet 3, but in addition to being energized itself, as shown by the heavy lines, is attracted by the energization of the frame magnet 3. We therefore have a compound energization and attraction at this point, and at this stage of the operation.

Assume now the position in Figure 8. The magnets 7 and 5, respectively third and first in the two armature series mentioned in the above description, have moved but a little farther when the armature magnet 7 became energized and the magnet 5 was about to be deenergized. The compound energization and attraction which occurred an instant before in respect to the frame and armature magnets 3 and 5, is now repeated in respect to the frame and armature magnets 2 and 7.

Any slight retardation to the rotation of the shaft 8 which might be caused by the energization of the armature magnet 6 which still remains, is fully overcome by the compound energization of the frame and armature magnets 2 and 7.

Summarizing the foregoing operation, magnets 5, 6 and 7 of the first armature series of three are successively energized in respect to the frame magnet 2, the final energization in respect to this series, including both the frame magnet 2 and armature magnet 7 so as to constitute the compound energization and attraction mentioned before. But happening the instant before this compound energization and attraction of the frame and armature magnets 2 and 7, we have the compound energization and attraction of the frame and armature magnets 3 and 5. Consequently the magnets 2 and 3 of the frame series are alternately energized, but only in conjunction with the magnets 5 and 7, first and last respectively in the armature series.

The armature magnet 6 is always singly energized in respect to each frame magnet in succession, and never in conjunction with any frame magnet. This particular mode of energizing the magnets of the improved magnetic motor, has been found to enable the reaching of a high rate of speed of rotation of the motor shaft 8, this high rate of speed being attributed solely to the constant pulling effort on the shaft by the evenly distributed impulses of the various sets of magnets. Attention is now directed to the details of construction, which are illustrated in Figures 1 to 4. The field frame 1 is not necessarily circular, but is so shown for convenience in illustration. It is mounted on a base 34 of any suitable construction. This base includes standards 35 on which the shaft 8 is journalled. The journals may either be of the conventional type illustrated, or may be provided with rollers or ball bearings.

Reading from left to right in Figure 3 we have the current distributing ring 9, which rotates with the shaft 8, the second ring 10, which is stationary with the field frame 1, and the third and common return ring 11, which in the present instance is also shown stationary by means of stay rods 36, or equivalent structure. The ring 10 is held stationary by arms 37, which are provided with dove-tailed grooves 38 on their inner ends for the occupation of a like tongue 39 on the ring 10.

In speaking of the rings 9, 10 and 11 in Figure 3, the term is used in a collective sense, so as to include both the insulating and the conducting portions. It is of course desirable to have those portions of the rings which have connection with outside metallic parts, well insulated from said parts to prevent any possible leakage of current or short circuiting. For example, in connection with the ring 10, it is to be observed that the dove-tailed tongue 39 is made integrally with adjacent insulating parts. No attempt has been made in the main views i. e. Figures 1 and 3, to show the wiring connection between the various brushes and companion magnets, the diagrammatic views being sufficient for this purpose.

Extensions 40 of the arms 37, carry the positive brushes 14 and 15 of the magnets 2 and 3 of the frame series. The reader will remember that these brushes are stationary, while the ring 9 moves with the shaft, but the brushes 22, 23 and 24 of the armature series, move with the armature 4 since their holders 41 are suitably connected thereto at 42.

The brushes 14 and 15 are mounted in holders 43, which in turn are mounted at 44 to the extensions 40 of the arms 37. One of the brush holders is shown in detail in Figure 2. It may be of any conventional construction and so may the brush 14. However, it is found desirable to include means for eliminating sparking on the distributing rings, and to this end an asbestos piece 45, soaked in oil, is made to bear on the ring ahead of the brush. This oiled asbestos piece serves as a lubricator for catching the sparks which tend to trail after the brush.

The reversing mechanism comprises the lever 46, extending within convenient reach of the operator, mounted on a portion of the normally stationary ring 10, by a swivel connection 47, which permits both vertical and lateral movement of the lever. The inner end of the lever has a fork connection with the flanged collar 49 on the inside of the ring 9.

This ring is loose on the shaft 8 but is made to turn therewith by the engagement of the key 50 with the upper recess of a slot 51 in the bore of the ring. The diagram in Figure 4 well illustrates the action.

Assume that it is desired to reverse the direction of rotation of the shaft 8. The shaft is now turning toward the observer. The operator moves the free end of the lever 46 toward the left. This displaces the ring 9 slightly toward the right on the shaft 8, until the key 50, fixed on the shaft, comes into line with the slot 51. There is a certain amount of retardation on the ring 9, caused by the brushes bearing thereon, and this retardation causes the key 50 to advance in the slot 51 until it reaches the lower recess.

In the meantime, the operator bears down on the free end of the lever 46, whereupon the fork connection 48 with the flanged collar 49, becomes the fulcrum on which the ring 10 is rotated or advanced toward the observer. The operator next moves the lever 46 toward the right, which movement brings the key 50 into the lower recess of the slot 51. The conducting segment of the two rings have, by the foregoing actions, been sufficiently displaced in respect to the various sets of brushes, to cause the reversal of the direction of rotation of the shaft. A spring 52, shown in Figure 3, may be employed to keep the loose ring 9 in engagement with the base of either of the slot recesses in Figure 1.

Mention has been made, among the objects of the invention, of the fact that various leverages on the shaft 8 may be obtained by varying the radial distance of the frame and armature magnets from the shaft. When thus extended, either the same ratio of frame and armature magnets, i. e. six to nine may be preserved, or the equivalent thereof may be employed taking advantage of the additional room.

It is also to be observed in Figure 3 that the field frame and armature magnet pole pieces are double so as to increase the areas from which the magnetic flux emanates and enters. The windings of the magnets are disposed between the pole pieces, the pole pieces being made up of laminations, according to approved construction. The windings are so arranged that the poles of the field frame magnets are respectively north and south when energized, but all like poles are on the same side. The pole pieces of the armature magnets are arranged in the same manner, but all south poles opposite frame magnet north poles, and vice versa. There is no time when two like poles oppose each other and consequently the element of magnetic repulsion never enters in the operation of the motor. It is always a case of magnetic attraction with the manifold advantages fully pointed out above.

While the construction and arrangement of the improved magnetic motor as herein described and claimed, is that of a generally preferred form, obviously modifications and changes may be made without departing from the spirit of the invention or the scope of the claims.

I claim:—

1. A motor, comprising a deenergized field frame electro-magnet, an armature including a series of deenergized electro-magnets, and means for first energizing certain of the armature electro-magnets in succession as they approach the field frame electro-magnets for the attraction of the former to the latter, and finally energizing the last electro-magnet of the armature series with the field frame electro-magnet to produce a compound magnetic attraction.

2. A motor, comprising a deenergized field frame electro-magnet, an armature with a series of electro-magnets deenergized in respect to the field frame electro-magnet up to a certain point of approach, means for conducting direct electric current to the armature electro-magnets to energize certain ones in succession as they pass said point, and thus attract themselves to the frame electro-magnet; and means for conducting direct electric current to the frame electro-magnet simultaneously with the energization of the last magnet of the armature series, to produce a compound attraction for the end of said series.

3. A motor, comprising a pair of frame electro-magnets, an armature with a pair of series of electro-magnets, and means, including an arrangement of distributing rings, for first producing the simultaneous energization by direct electric current, of the second electro-magnet of the frame series and the first electro-magnet of the second armature series, and subsequently the simultaneous energization of the first magnet of the frame series and the last magnet of the first armature series.

4. A motor, comprising a series of pairs of electro-magnets, an armature with a series of triplets of electro-magnets, means for singly energizing the first and second electro-magnets of the armature triplets in succession in respect to the frame electro-magnet pairs so that the former may be attracted to the latter, and means for energizing the second electro-magnets of the frame pairs simultaneously with the energization of the first electro-magnets of the armature triplets, and subsequently energizing the first electro-magnets of the frame pairs simultaneously with the energization of the last electro-magnets of the armature triplets, to produce compound magnetic attractions alternating between the magnets of the frame pairs.

5. A motor, comprising a series of pairs of electro-magnets, an armature with a series of triplets of electro-magnets, means distributing direct electric current to singly energize the electro-magnets of the armature triplets in succession in respect to each electro-magnet of the frame pairs, means for distributing direct electric current to first energize the second electro-magnets of the frame pairs simultaneously with the energization of the first electro-magnets of the armature triplets, and secondly to energize the first electro-magnets of the frame pairs simultaneously with the last electro-magnets of the armature triplets, the foregoing energizations respectively producing single attractions of the armature electro-magnets to the frame electro-magnets and compound magnetic attractions alternating between the magnets of the frame pairs, and means in common connection with all electro-magnets providing a common current return.

6. A motor, comprising a fixed field magnet frame with pairs of electro-magnets, a shaft with an armature having triplets of electro-magnets, a ring moving with the shaft, for distributing positive direct electric current to the frame electro-magnets; a ring fixed in respect to the field magnet frame, for distributing positive direct electric current to the armature electro-magnet; and a ring with connections common to all electro-magnets, for conducting negative electric currents therefrom.

7. A motor, comprising a fixed field magnet frame with pairs of electro-magnets, a shaft with an armature having triplets of electro-magnets, a ring moving with the shaft, for distributing positive direct electric current to the frame electro-magnets; a ring fixed in respect to the field magnet frame, for distributing positive direct electric current to the armature electro-magnet; a ring with connections common to all electro-magnets, for conducting negative electric currents therefrom, and means for shifting the first distributing ring in respect to the shaft to produce a reversal of rotation of the shaft.

8. A motor, comprising a fixed field magnet frame with pairs of electro-magnets, a shaft with an armature having triplets of electro-magnets, a ring moving with the shaft, for distributing positive direct electric current to the frame electro-magnets; a ring fixed in respect to the field magnet frame, for distributing positive direct electric current to the armature electro-magnets; a ring with connections common to all electro-magnets, for conducting negative electric currents therefrom, and means for shifting the first and second distributing rings in respect to the shaft to produce a reversal of the direction of rotation thereof.

9. A motor, comprising a fixed field magnet frame with pairs of electro-magnets, a shaft with an armature having triplets of electro-magnets, a ring moving with the shaft, for distributing positive direct electric current to the frame electro-magnets; a ring fixed in respect to the field magnet frame, for distributing positive direct electric current to the armature electro-magnets; a ring with connections common to all electro-magnets, for conducting negative electric currents therefrom, and means, including a common lever, for axially shifting the first distributing ring to secure a changing of its position circumferentially of the shaft, then similarly changing the second ring by moving the lever, to secure a reversal of the direction of rotation of the shaft.

ROBERT H. DAVIS.